(12) United States Patent
Lin et al.

(10) Patent No.: US 9,998,755 B2
(45) Date of Patent: Jun. 12, 2018

(54) METHOD AND APPARATUS FOR MOTION INFORMATION INHERITANCE IN THREE-DIMENSIONAL VIDEO CODING

(71) Applicant: MediaTek Inc., Hsin-Chu (TW)

(72) Inventors: Jian-Liang Lin, Su'ao Township Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 393 days.

(21) Appl. No.: 14/433,348

(22) PCT Filed: Sep. 30, 2013

(86) PCT No.: PCT/CN2013/084763
§ 371 (c)(1),
(2) Date: Apr. 2, 2015

(87) PCT Pub. No.: WO2014/053099
PCT Pub. Date: Apr. 10, 2014

(65) Prior Publication Data
US 2015/0281729 A1  Oct. 1, 2015

Related U.S. Application Data

(60) Provisional application No. 61/750,900, filed on Jan. 10, 2013, provisional application No. 61/744,860, filed on Oct. 3, 2012.

(51) Int. Cl.
*H04N 19/55* (2014.01)
*H04N 19/176* (2014.01)
(Continued)

(52) U.S. Cl.
CPC ......... *H04N 19/55* (2014.11); *H04N 13/0048* (2013.01); *H04N 19/105* (2014.11);
(Continued)

(58) Field of Classification Search
None
See application file for complete search history.

(56) References Cited

U.S. PATENT DOCUMENTS

| 2005/0053293 A1 | 3/2005 | Lin et al. |
| 2011/0058017 A1 | 3/2011 | Lee et al. |

(Continued)

FOREIGN PATENT DOCUMENTS

| CN | 101911700 | 12/2010 |
| CN | 102257818 | 11/2011 |
| WO | WO 2007/081140 | 7/2007 |

OTHER PUBLICATIONS

Tech et al. ("3D-HEVC Test Model 1" ITU-T Jul. 2012).*
Hannuksela, M.M., et al.; "3D-AVC Draft Ext 3;" Joint Collaborative Team on 3D Video Coding Extension Development of ITU-T SG 16 WP 3 and ISO/IEC JTC 1/SC 29/WG 11; Jul. 2012; pp. 1-68.
Laroche, G., et al.; "RD Optimized Coding for Motion Vector Predictor Selection;" IEEE Transactions on Circuits and Systems for Video Technology; vol. 18; No. 9; Sep. 2008; pp. 1247-1257.

(Continued)

*Primary Examiner* — Kate Luo
(74) *Attorney, Agent, or Firm* — McClure, Qualey & Rodack, LLP (57) ABSTRACT

A method and apparatus to determine motion information for a current depth region depending on the motion information associated with a co-located texture region are provided for three-dimensional video. The motion information for the current depth region is set to pre-defined motion information or derived motion information if the co-located texture region of the texture picture or any texture sub-region in the co-located texture region is Intra-coded or has no valid motion information. The pre-defined motion information may correspond to motion vector (0,0), reference index 0, and a prediction type as indicated by a slice type. In one embodiment, the motion information for the current depth region is determined according to a subset of 8×8 texture sub-regions for a system with asymmetric resolution and the texture region corresponding to a macroblock.

16 Claims, 7 Drawing Sheets

(51) Int. Cl.
*H04N 19/174* (2014.01)
*H04N 19/597* (2014.01)
*H04N 13/00* (2018.01)
*H04N 19/105* (2014.01)
*H04N 19/52* (2014.01)
*H04N 19/159* (2014.01)

(52) U.S. Cl.
CPC ......... *H04N 19/159* (2014.11); *H04N 19/174* (2014.11); *H04N 19/176* (2014.11); *H04N 19/52* (2014.11); *H04N 19/597* (2014.11)

(56) References Cited

U.S. PATENT DOCUMENTS

| | | | |
|---|---|---|---|
| 2011/0216833 A1* | 9/2011 | Chen | H04N 13/0022 375/240.16 |
| 2012/0236934 A1* | 9/2012 | Chen | H04N 19/597 375/240.03 |
| 2014/0341291 A1* | 11/2014 | Schwarz | H04N 19/597 375/240.16 |

OTHER PUBLICATIONS

Lin, J.L., et al.; "JCT3V-C0136 3D-CE3.a related Unconstrained inside-view motion prediction in 3D video coding;" 3rd JCT-3V Meeting in Geneva; 2012; pp. 1-8.

Lin, J.L., et al.; "3D-CE3.a related Unconstrained inside-view motion prediction in 3D video coding;" Joint Collaborative Team on 3D Video Coding Extension Development of ITU-T SG 16 WP 3 and ISO/IEC JTC 1/SC 29/WG 11; Jan. 2013; pp. 1-4.

International Search Report dated Jan. 2, 2014, issued in PCT/CN2013/084763.

Zhu, B., et al.; "Depth Map Compression Algorithm . . . ;" Journal of Ningbo University; vol. 22; No. 3; Sep. 2009; pp. 317-321.

Oh, K.J., et al.; "3D-AVC results on improved inside view motion prediction;" Joint Collaborative Team on 3D Video Coding Extension Development of ITU-T SG 16 WP 3 and ISO/IEC JTC 1/SC 29WG 11; Jul. 2012; pp. 1-2.

* cited by examiner

METHOD AND APPARATUS FOR MOTION INFORMATION INHERITANCE IN THREE-DIMENSIONAL VIDEO CODING

CROSS REFERENCE TO RELATED APPLICATIONS

The present invention is a National Stage of PCT/CN2013/084763, filed on Sep. 30, 2013, which claims priority to U.S. Provisional Patent Application Ser. No. 61/744,860, filed on Oct. 3, 2012, entitled "Unconstrained Motion Parameter Inheritance" and U.S. Provisional Patent Application Ser. No. 61/750,900, filed on Jan. 10, 2013, entitled "Methods of Setting the Default Motion Information in Motion Prediction". The priority applications are hereby incorporated by reference in their entireties.

TECHNICAL FIELD

The present invention relates to three-dimensional video coding. In particular, the present invention relates to depth coding using motion information inherited from texture pictures in three-dimensional video coding.

BACKGROUND

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). In 3D-HEVC, a technique named motion parameter inheritance (MPI) has been developed to allow depth maps to inherit motion information from texture pictures. The basic idea behind the MPI mode is that the motion characteristics of the video signal and its associated depth map should be similar, since both correspond to projections of the same scenery from the same viewpoint at the same time instant. In order to enable efficient encoding of the depth map data, the MPI mode is used to allow the depth map data to inherit the coding unit (CU) and prediction unit (PU) partitions and corresponding motion parameters from the corresponding video signal. The motion vectors of the video signal according to HEVC use quarter-sample accuracy. On the other hand, the motion vectors of the depth maps use full-sample accuracy. Therefore, in the inheritance process, the motion vectors of the video signal are quantized to nearest full-sample positions. The decision regarding whether to inherit motion information from the video signal or to use own motion information can be made adaptively for each block of the depth map.

Figure 1:
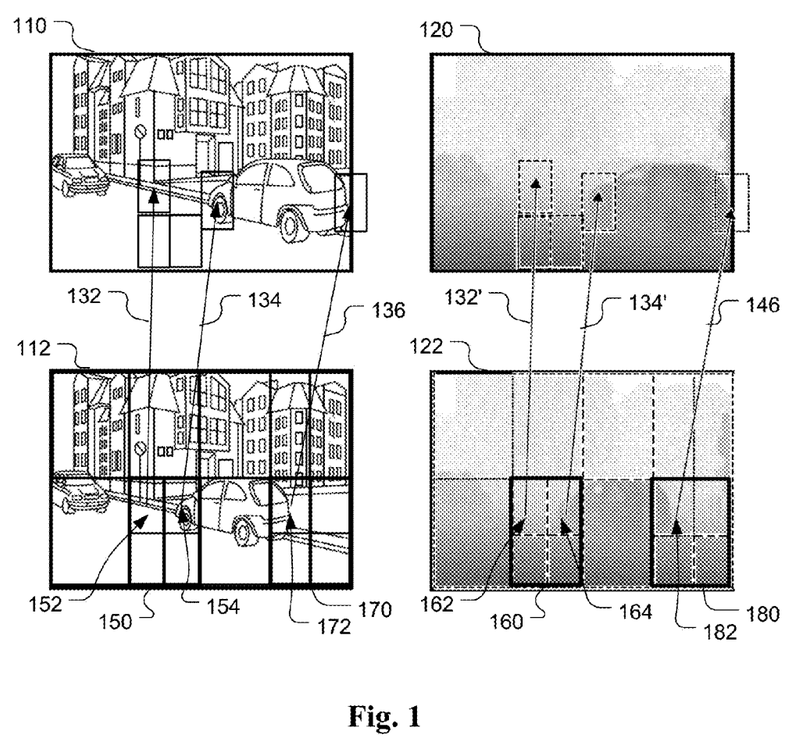
FIG. 1 illustrates an example of motion parameter inheritance adopted in three-dimensional coding based on Advanced Video Coding (3D-AVC).

FIG. 1 illustrates an example of MPI for depth coding in 3D-HEVC. Texture picture 112 corresponds to a current picture and texture picture 110 corresponds to a picture at a reference time instance. Both texture pictures 110 and 112 are in the same view. Block 150 (e.g., a CU) in current picture 112 is partitioned into four sub-blocks. Motion vectors 132 and 134 are associated with sub-blocks 152 and 154. Depth block 160 is co-located with texture block 150 and may inherit motion information from texture block 150. Accordingly, sub-blocks 162 and 164 may inherit motion information (e.g., motion vectors 132' and 134') from respective sub-blocks 152 and 154. Block 170 in current picture 112 is partitioned into four sub-blocks. Motion vector 136 is associated with sub-block 172. Depth block 180 is co-located with texture block 170. Depth sub-block 182 does not inherit motion information from co-located texture sub-block. In this case, an own motion vector 146 is transmitted for the corresponding depth sub-block 182. For signaling the MPI coding mode, the Merge/Skip mode syntax is used. The list of possible Merge candidates has been extended for depth map coding so that the first Merge candidate refers to MPI coding mode, i.e., inheriting motion information and CU/PU structure of the corresponding block of the associated video signal in this case.

The MPI mode can be used in any level of the hierarchical coding-tree block of the depth map. If the MPI mode is indicated at a higher level of the depth map coding tree, the depth map data in this higher level unit can inherit the CU/PU subdivision as well as the corresponding motion data from the video signal. This higher level unit may be larger than the CU size for the video signal. Accordingly, it possible to specify MPI mode for a whole tree-block, typically corresponding to 64×64 image samples, and the whole tree-block of the depth map is partitioned into CUs and PUs by inheriting the CU and PU partitioning of the corresponding region of the video signal. If the MPI mode is indicated at a level of the coding tree that is smaller than or the same size as the corresponding CU size of the video signal, only the motion data are inherited from the video signal. When the MPI mode is used, not only the partitioning and the motion vectors, but also the reference picture indices are inherited from the video signal. Therefore, it has to be ensured that the depth maps corresponding to the video reference pictures are also available in the reference picture buffer for the depth map signal. The MPI mode is only possible, if the whole region of the video signal is coded using Inter prediction.

The syntax design for the existing 3D-HEVC still allows the encoder to signal the MPI mode as ON (i.e., to enable the MPI mode) even though partial corresponding region of the video signal is coded using Intra prediction or the region has no valid reference data, i.e., no reference picture inherited from the corresponding region is available in the reference picture list of the current slice. In this case, inconsistency of MPI may happen due to different implementation between an encoder and a decoder. As a result, mismatch may occur in decoded pictures. There may be risks that a decoder exhibits unexpected behavior by using undefined motion information.

There is also similar development effort of 3D video coding based on the Advanced Video Coding (AVC) standard, which is often referred as H.264. The AVC-based 3D video coding is referred as 3D-AVC. In, 3D-AVC, the system also faces the redundancy issue between the texture view component and the depth view component. Since the texture pictures and its associated depth maps correspond to similar object silhouette, both will experience similar object movement. Accordingly, there is significant redundancy in the motion fields between the texture view component and the depth view component. A new coding mode is used in the existing 3D-AVC to allow the associated depth view component to use the motion information from a texture view component. The new mode is called Inside View Motion Prediction (IVMP) mode, which is enabled only for Inter coded Macroblocks (MBs) of the depth view component. The size of an MB is 16×16 for the AVC standard. In the IVMP mode, the motion information, including mb_type, sub_mb_type, reference indices and motion vectors of the co-located MB in the texture view component is reused by the depth view component of the same view. A flag is signaled in each MB to indicate whether the MB uses the IVMP mode.

Figure 2:
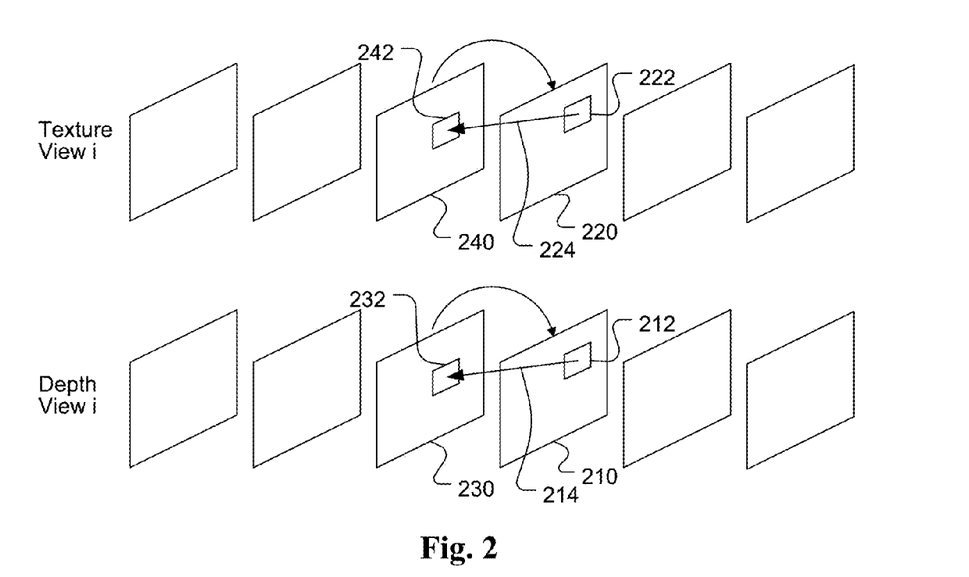
FIG. 2 illustrates an example of motion prediction from texture to depth as adopted in the High Efficiency Video Coding based three-dimensional (3D) video coding.

FIG. 2 illustrates an example of the IVMP for texture pictures and depth maps in view i of 3D-AVC. If the IVMP flag associated with MB 212 of depth map 210 indicates that MB 212 uses the IVMP mode, MB 212 will reuse motion information of a co-located MB (222) of a corresponding texture picture (220). If texture MB 222 has a motion vector (224) pointing to texture MB 242 in texture picture 240, depth MB 212 may use motion vector 214 inherited from motion vector 224 to refer to a reference MB (232) in a reference depth map (230). In the existing implementation, the IVMP mode applies only to non-anchor pictures as specified in the H.264 standard.

Figure 3:
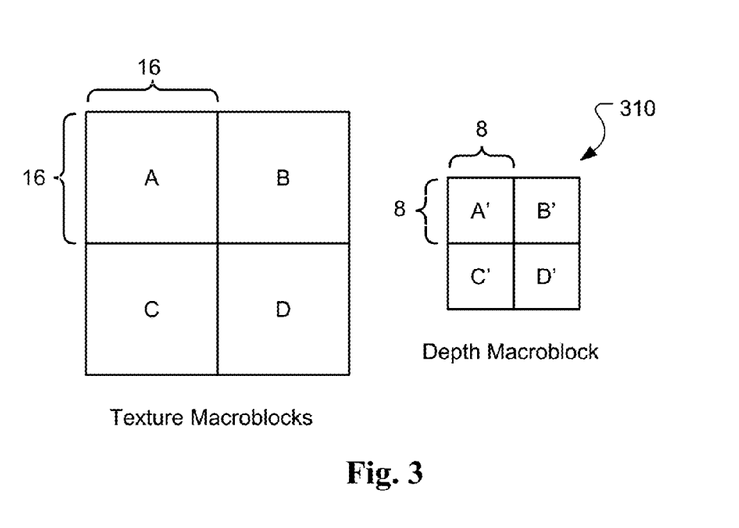
FIG. 3 illustrates an example of macroblock correspondence between texture and depth for a mixed resolution three dimensional video coding system.

3D video formats also support the mixed resolution, i.e., the width and height of the depth map may be different from the width and height of the texture picture. The mixed resolution is also called asymmetric coding. In asymmetric coding, the existing IVMP is enabled when all of the corresponding four texture macroblocks are coded as Skip or Inter 16×16 or Inter 16×8 or Inter 8×16. The four texture macroblocks (i.e., macroblocks A, B, C and D) correspond to one depth macroblock (310) as shown in FIG. 3. In IVMP, motion information of each texture macroblock (i.e., 16×16) is mapped to an 8×8 sub-block of one depth macroblock. For example, texture macroblock A is mapped to depth sub-block A' as shown in FIG. 3.

For depth maps, the motion prediction is performed based on 8×8 block unit. In IVMP, the sub-block type and motion information associated with the 8×8 block unit depend on corresponding texture macroblock. For example, the sub-block type of sub-block A' will be 8×4 if mb_type of macroblock A is P16×8 (i.e., predictive-coded 16×8 block). The H.264/AVC standard also provides syntax to signal the reference index for each 8×8 block and motion vector for each 4×4 block. When IVMP is used, the representative motion information has to be determined when the corresponding texture macroblock has multiple reference indexes.

In the conventional 3D-AVC, inside-view motion prediction (IVMP) is enabled for depth view coding. When IVMP is enabled, the corresponding motion information from the texture view may be inherited. For symmetric coding between texture and depth views, i.e., texture pictures and depth maps having the same resolution, the motion information of co-located macroblock in the texture view is inherited. For mixed resolution cases, i.e., texture pictures and depth maps having different resolutions (typically depth signal having a lower resolution), one macroblock in the depth view may correspond to multiple texture macroblocks. For example, in the case that both width and height of depth views are reduced by half compared to those of texture views, one macroblock in the depth view corresponds to four macroblocks in the associated texture view. To signal the IVMP mode, one flag may be signaled in the macroblock level. However, if one of the following conditions is true, the IVMP flag is not transmitted and inferred to be 0.

For mixed resolution cases, the co-located macroblock in the texture view is Intra coded, or View Synthesis Prediction (VSP) is used for any partition in the current macroblock.

For mixed resolution cases that the width and height of depth maps are half of those of texture pictures, if any of the four co-located macroblocks in the texture view is Intra coded, or has mb_type equal P_8×8, P_8×8ref0 or B_8×8, or includes VSP.

View Synthesis Prediction (VSP) is a technique used in 3D video coding to provide prediction using reference pictures from previously coded views (e.g., a base view). In VSP, the reference texture picture and depth map in a reference view are used to generate the prediction for texture picture or depth map in a target view. When a texture macroblock is coded with macroblock type (i.e., mb_type) equal to P_8×8, P_8×8ref0 or B_8×8, the texture macroblock is divided into four 8×8 sub-macroblocks and each sub-macroblock is coded using P_8×8, P_8×8ref0 or B_8×8 mode respectively.

With the conditional signalling of the IVMP mode, coding bits related to unnecessary IVMP signalling could be saved. However, the conditional signalling increases complexity and may also experience parsing dependency issue, where the parsing process of the IVMP flag relies on the coding mode and reference picture type of the co-located macroblock(s). It is desirable to overcome the complexity and dependency issue associated with IVMP mode of 3D-AVC.

SUMMARY

A method and apparatus for three-dimensional video coding are disclosed. Embodiments of the present invention determine motion information for a current depth region depending on the motion information associated with a co-located texture region, where the motion information for the current depth region is set to pre-defined motion information or derived motion information if the co-located texture region of the texture picture or any texture sub-region in the co-located texture region is Intra-coded or has no valid motion information. The pre-defined motion information may correspond to motion vector (0,0), reference index zero, and a prediction type as indicated by a slice type.

In one embodiment, for the depth map having half horizontal and vertical resolutions of the texture picture and the co-located texture region corresponding to a texture macroblock, the motion information for the current depth region is set to the pre-defined motion information or the derived motion information if the co-located texture region is coded using view synthesis prediction (VSP) or the co-located texture region is partitioned into 8×8 texture sub-regions, and wherein the 8×8 texture sub-region is selected from a group comprising P_8×8, P_8×8ref0 and B_8×8 texture sub-region. The motion information for the current depth region may be determined depending on a subset of the 8×8 texture sub-regions. For example, the motion information for the current depth region can be set to 8×8 partition type, reference index −1 and motion vector (0,0) if both top-left and bottom-right 8×8 texture sub-regions have no valid motion information. In another example, if only one of the top-left and bottom-right 8×8 texture sub-regions has the valid motion information, partition type for the current depth region can be set to 8×8 and the motion information for the current depth region can be determined according to the motion information associated with the texture sub-regions having valid motion information. In yet another example, if both of the top-left and bottom-right 8×8 texture sub-regions have valid motion information with a same valid reference index, partition type can be set to 8×4/4×8 and the motion information for a first current depth 8×4/4×8 sub-region can be determined according to the motion information of a top-left 8×8 texture sub-region, and the motion information for a second current depth 8×4/4×8 sub-region is determined according to the motion information of a bottom-right 8×8 texture sub-region. In yet another example, if the top-left and bottom-right 8×8 texture sub-regions have valid motion information but different valid reference indices, partition type can be set to 8×8 and the motion information for the current depth region is determined according to the motion information of the co-located texture region.

In another embodiment, the derived motion information can be derived from a neighboring texture region or neighboring texture sub-region of the co-located texture region of the texture picture or from one or more texture sub-regions inside the co-located texture region. The motion information for the current depth region can be determined according to the motion information associated with an Above, Left, Right or Below neighboring texture region or texture sub-region of the co-located texture region. The motion information for the current depth region can also be determined according to the motion information associated with a neighboring depth region or depth sub-region of the current depth region.

In yet another embodiment, a current depth region corresponds to a current depth prediction unit (PU) and the co-located texture region corresponds to a co-located texture PU. The motion information for the current depth PU can be determined according to the motion information associated with an Above, Left, Right or Below neighboring texture PU of the co-located texture PU.

DETAILED DESCRIPTION

In the conventional 3D-HEVC, the Motion Parameter Inheritance (MPI) mode is only allowed for depth blocks with the whole corresponding region of the video signal coded using Inter prediction. If MPI is selected for a depth block and the whole corresponding region of the video signal is coded using Inter prediction, the motion data and CU/PU partitioning of the depth block can be inherited from those of the corresponding region of the video signal. However, the syntax design of the existing 3D-HEVC still allows the encoder to signal the MPI mode as ON (i.e., to enable the MPI mode) even though partial corresponding region of the video signal is coded using Intra prediction. In this case, inconsistency of MPI may happen due to the different implementation between the encoder and the decoder. As a result, mismatch may occur in decoded pictures. There may be risks that a decoder exhibits unexpected behavior by using undefined motion information.

To avoid such mismatch due to the different implementation of the undefined motion data between an encoder and a decoder for the Intra coded region or a region having no valid reference data, and to prevent an unexpected behavior of the decoder, embodiments of the present invention use predetermined motion data for the Intra coded region or the region with unknown motion data to eliminate possible unexpected decoder behavior. The region may correspond to a coding unit, a prediction unit or a picture area larger than a coding unit. In the following, a region has unknown or no valid motion data/information could be the region has no associated motion vector, for example, the region is Intra coded or VSP coded, or the reference index of the region is invalid. The reference index is only valid if it is within (0, 1, . . . , size of reference picture list-1).

Figure 4:
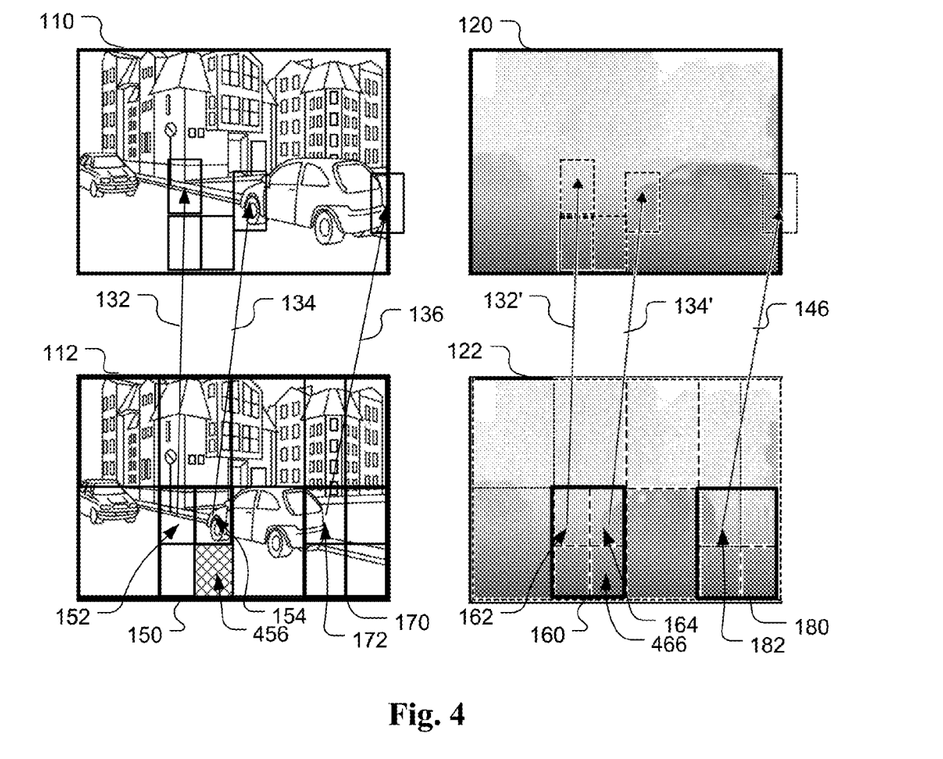
FIG. 4 illustrates an example of motion parameter inheritance incorporating an embodiment of the present invention to avoid unexpected decoder behavior.

In a first embodiment, the Intra coded region (or the region with unknown motion data) is filled up with pre-defined motion information, such as motion vector equal to (0,0), reference index equal to 0, and prediction type (uni-prediction or bi-prediction) according to the slice type as shown in FIG. 4. For example, region 456 of current texture picture 112 corresponds to an Intra coded region and has no motion information. In this case, the corresponding region (466) of depth map 122 will use pre-defined motion information, such as motion vector (0,0), reference index 0, and prediction type (uni-prediction or bi-prediction) as specified in the slice type. This will solve the inconsistency of MPI data between an encoder and a decoder.

In the second embodiment, if a current slice is a P-slice, the Intra coded region (or the region with unknown motion data) is filled up with:

For List 0: motion vector (0,0), reference index 0, and prediction type uni-prediction.

If current slice is a B-slice, the Intra coded region (or the region with unknown motion data) is filled up with For List 0: motion vector (0,0), reference index 0, For List 1: motion vector (0,0), reference index 0, Prediction type: bi-prediction.

Figure 5:
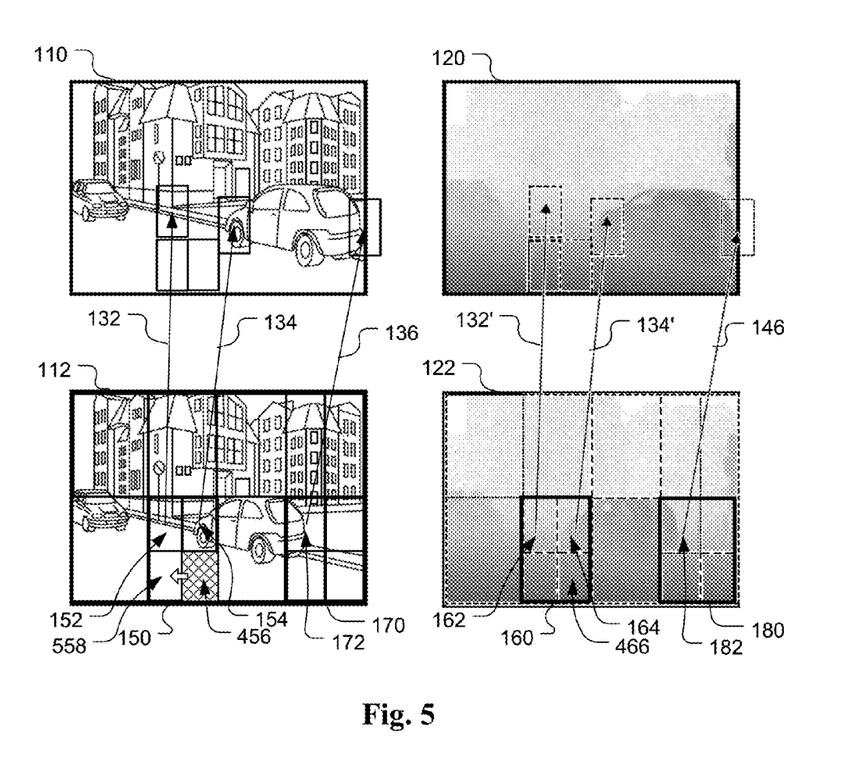
FIG. 5 illustrates another example of motion parameter inheritance incorporating an embodiment of the present invention to avoid unexpected decoder behavior.

In the third embodiment, the Intra coded region (or the region with unknown motion data) is filled up with motion data from its neighboring PU, such as the Left, Above, Right, or Below PU. For example, the Intra coded region (456) can be filled up with motion data from the Left PU (558) as shown in FIG. 5. Accordingly, the corresponding region (466) of depth map 122 will use motion information corresponding to region 558 of texture picture 112.

In the fourth embodiment, the Intra coded region (or the region with unknown motion data) is filled up with motion data of another region with valid motion data according to a predefined order. For example, the Intra code region is filled up with motion data from its Left PU. If the Left PU is also Intra coded, it is then filled up with motion data from its Above PU. If both Left and Above PU are Intra coded, it will be filled up with motion data from its Above-Left PU or be filled up with motion vector (0,0), reference index 0, and prediction as indicated by the slice type.

In the fifth embodiment, the Intra coded region (or the region with unknown motion data) is filled up with motion data from its Above PU. If the Above PU is also Intra coded, it is then filled up with motion data from its Left PU. If both Left and Above PU are Intra coded, it is filled up with motion data from its Above-Left PU or be filled up with motion vector (0,0), reference index 0, and prediction type as indicated in the slice type.

In the sixth embodiment, the Intra coded region (or the region with unknown motion data) is filled up with motion data from its Left PU. If the Left PU is also Intra coded, it is then filled up with motion data from its Right PU.

The performance of motion parameter inheritance incorporating an embodiment of the present invention is compared with the performance of an anchor system based on HTM-4.0 as shown in Table 1. The performance comparison is performed based on different sets of test data listed in the first column. The BD-rate differences are shown for texture pictures in view 0 (video 0), view 1 (video 1) and view 2 (video 2). A positive value in the BD-rate implies the present invention has a lower performance. As shown in Table 1, the BD-rates for texture pictures in all views have the same BD-rate performance as HTM-4.0. The second and third groups of performance are the bitrate measure for texture video only, synthesized only (synth. only) and coded and synthesized (coded and synth.). As shown in Table 1, there is an improvement about 0.1% for the second and third groups. The processing times (encoding time and decoding time) are also compared. As shown in Table 1, the encoding time and decoding are about the same.

Furthermore, embodiments of the present invention also support the IVMP mode for the P_8×8, P_8×8ref0, or B_8×8, or view synthesis prediction.

Figure 6:
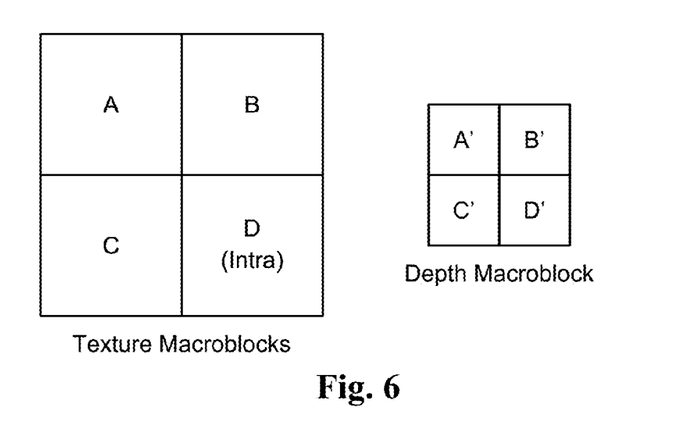
FIG. 6 illustrates an exemplary scenario of potential encoder-decoder mismatch in motion parameter inheritance due to an Intra-coded texture macroblock.

In the seventh embodiment, the Intra coded/view synthesis prediction/P_8×8/P_8×8ref0/B_8×8 region (or the region with unknown motion data) is filled up with pre-defined motion data, such as motion vector (0,0), reference index 0, and prediction type (uni-prediction or bi-prediction) as indicated in the slice type. This will solve inconsistency of IVMP data between an encoder and a decoder. An example is shown in FIG. 6, where texture macroblock D is Intra-coded. Therefore, corresponding depth sub-block D' uses pre-defined motion data, such as motion vector (0,0), reference index 0, and prediction type (uni-prediction or bi-prediction) as indicated by the slice type.

In the eighth embodiment, if current slice is a P-slice, the Intra coded/view synthesis prediction/P_8×8/P_8×8ref0/B_8×8 region (or the region with unknown motion data) is filled up with:

For List 0: motion vector (0,0), reference index 0, and prediction type uni-prediction.

If current slice is a B-slice, the Intra coded/view synthesis prediction/P_8×8/P_8×8ref0/B_8×8 region (or the region with unknown motion data) is filled up with:

For List 0: motion vector (0,0), reference index 0,

For List 1: motion vector, (0,0), reference index 0,

Prediction type: bi-prediction.

Figure 7:
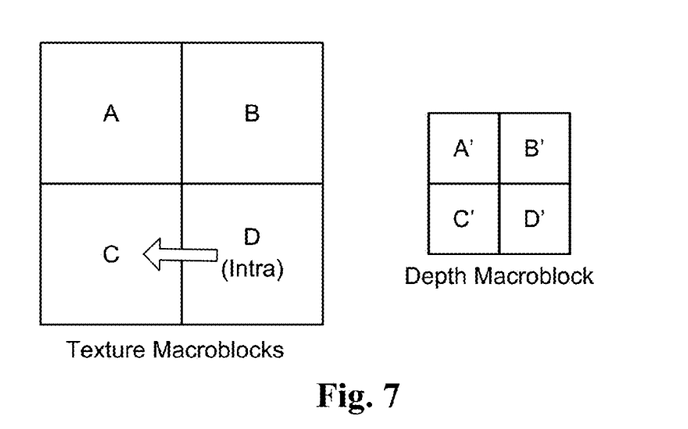
FIG. 7 illustrates an example of motion parameter inheritance according to an embodiment of the present invention to avoid potential encoder-decoder mismatch.

In the ninth embodiment, the Intra coded/view synthesis prediction/P_8×8/P_8×8ref0/B_8×8 region (or the region with unknown motion data) is filled up with motion data from its neighboring block which may be the neighboring macroblock(s) or the neighboring sub-block(s), such as its Left, Above, Right, or Below macroblock(s) or sub-block(s). For example, the Intra coded region is filled up with motion data from its Left macroblock as shown in FIG. 7. In this case, depth sub-block D' may inherit motion data corresponding to macroblock C of the texture view.

In the tenth embodiment, the Intra coded/view synthesis prediction/P_8×8/P_8×8ref0/B_8×8 region (or the region with unknown motion data) is filled up with motion data from its Left macroblock(s)/sub-block(s). If the Left macroblock(s)/sub-block(s) is also Intra coded/view synthesis prediction/P_8×8/P_8×8ref0/B_8×8, it will then be filled up

TABLE 1

|  | video 0 | video 1 | video 2 | video only | Synth. only | coded & synth. | enc time | dec time |
| --- | --- | --- | --- | --- | --- | --- | --- | --- |
| Balloons | 0.0% | 0.0% | 0.0% | 0.0% | −0.1% | −0.1% | 99.9% | 101.8% |
| Kendo | 0.0% | 0.0% | 0.0% | 0.0% | −0.1% | −0.2% | 104.9% | 101.4% |
| Newspapercc | 0.0% | 0.0% | 0.0% | 0.0% | −0.1% | −0.1% | 101.9% | 113.0% |
| GhostTownFly | 0.0% | 0.0% | 0.0% | 0.0% | 0.0% | 0.0% | 100.1% | 98.3% |
| PoznanHall2 | 0.0% | 0.0% | 0.0% | 0.0% | −0.3% | −0.3% | 103.4% | 103.5% |
| PoznanStreet | 0.0% | 0.0% | 0.0% | 0.0% | −0.2% | −0.2% | 95.7% | 89.4% |
| UndoDancer | 0.0% | 0.0% | 0.0% | 0.0% | −0.1% | −0.1% | 96.5% | 91.1% |
| 1024 × 768 | 0.0% | 0.0% | 0.0% | 0.0% | −0.1% | −0.1% | 102.2% | 105.3% |
| 1920 × 1088 | 0.0% | 0.0% | 0.0% | 0.0% | −0.1% | −0.1% | 98.9% | 95.4% |
| average | 0.0% | 0.0% | 0.0% | 0.0% | −0.1% | −0.1% | 100.3% | 99.5% |

As mentioned before, the mismatch issue also exists in 3D-AVC. In order to avoid the mismatch problem due to different implementation of the undefined motion data for the Intra coded/view synthesis prediction/P_8×8/P_8×8ref0/B_8×8 region between an encoder and a decoder, and to prevent an unexpected decode behavior, embodiments of the present invention use pre-determined motion data for the Intra coded/view synthesis prediction/P_8×8/P_8×8ref0/B_8×8 region or the region with unknown motion data.

with motion data from its Above macroblock(s)/sub-block(s). If both Left and Above macroblock(s)/sub-block(s) are Intra coded/view synthesis prediction/P_8×8/P_8×8ref0/B_8×8, it will be filled up with motion data from its Above-Left macroblock(s)/sub-block(s) or filled up with motion vector (0,0), reference index 0, and prediction type as indicated in the slice type.

In the eleventh embodiment, the Intra coded/view synthesis prediction/P_8×8/P_8×8ref0/B_8×8 region (or the region with unknown motion data) is filled up with motion data from its Above macroblock(s)/sub-block(s). If the Above macroblock(s)/sub-block(s) is also Intra coded/view synthesis prediction/P_8×8/P_8×8ref0/B_8×8, it will then be filled up with motion data from its Left macroblock(s)/sub-block(s). If both Left and Above macroblock(s)/sub-block(s) are Intra coded/view synthesis prediction/P_8×8/P_8×8ref0/B_8×8, it will be filled up with motion data from its Above-Left macroblock(s)/sub-block(s) or be filled up with motion vector (0,0), reference index 0, and prediction type as indicated in the slice type.

In the twelfth embodiment, the Intra coded/view synthesis prediction/P_8×8/P_8×8ref0/B_8×8 region (or the region with unknown motion data) is filled up with motion data from its Left macroblock(s)/sub-block(s). If the Left macroblock(s)/sub-block(s) is also Intra coded/view synthesis prediction/P_8×8/P_8×8ref0/B_8×8, it will then be filled up with motion data from its Right macroblock(s)/sub-block(s).

Figure 8:
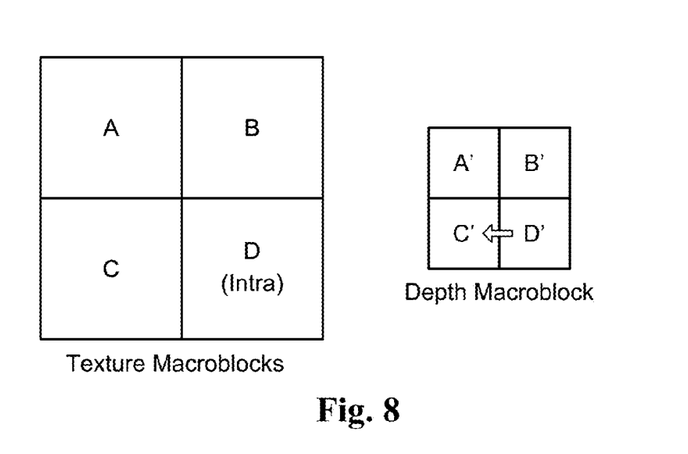
FIG. 8 illustrates another example of motion parameter inheritance according to an embodiment of the present invention to avoid potential encoder-decoder mismatch.

In the thirteenth embodiment, the Intra coded/view synthesis prediction/P_8×8/P_8×8ref0/B_8×8 region (or the region with unknown motion data) is filled up with motion data from its neighboring depth block(s), which may be the neighboring depth macroblock(s) or the neighboring depth sub-block(s), such as its Left, Above, Right, or Below depth macroblock(s) or sub-block(s). FIG. 8 illustrates an example where macroblock D of the texture view is Intra coded. Therefore, corresponding depth sub-block D' uses motion data from the Left depth sub-block (i.e., C').

In the fourteenth embodiment, the P_8×8/P_8×8ref0/B_8×8 region is filled up with motion data for each list (list0 or list1) by checking only partial sub-blocks to reduce the complexity according to the following procedure:
1. If both 8×8 sub-blocks A and D in FIG. 9 have no valid references data in the list, the following procedure is applied; otherwise go to step 2.
Set the current 8×8 depth partition type to 8×8 and fill each 4×4 block of current 8×8 depth block with the motion data of reference index −1 (i.e., indicating no reference picture) and motion vector (0,0).
2. If only one of sub-blocks A and D has a valid reference data in the list, that is the motion information is available in that list, the following procedure is applied; otherwise go to step 3.
Set the current 8×8 depth partition type to 8×8 and fill each 4×4 block of current 8×8 depth block with the motion data of the sub-block having valid reference data.
3. If sub-blocks A and D have the same reference index in the list, the following procedure is applied; otherwise go to step 4.
Set the current 8×8 depth partition type to 4×8 and fill the first 4×8 block of current 8×8 depth block with the motion data of the sub-block A (i.e., using motion data of A0 as the representative motion data of A); fill second 4×8 block of current 8×8 depth block with the motion data of the sub-block D (i.e., using motion data of D0 as the representative motion data of D).
4. If sub-blocks A and D have different references index in the list, the following procedure is applied
Set the current 8×8 depth partition type to 8×8 and fill current 8×8 depth block with the same motion data of the texture sub-blocks have the same relative position as current 8×8 depth block within its macroblock. For example, if current 8×8 depth block is top-left 8×8 block of a depth macroblock, it will use texture sub-block A (i.e., using motion data of A0 as the representative motion data of A) to fill the motion data.

Figure 9:
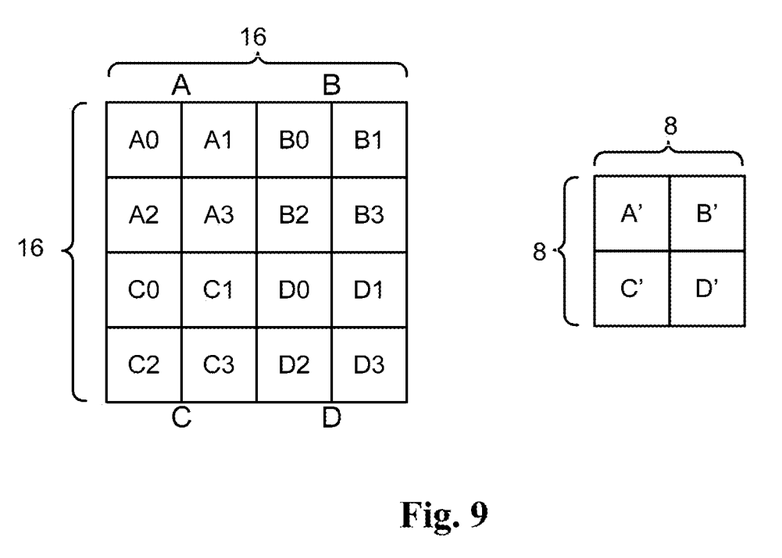
FIG. 9 illustrates yet another example of motion parameter inheritance according to an embodiment of the present invention to avoid potential encoder-decoder mismatch.

In the fifteenth embodiment, the procedure is similar to the procedure of the fourteenth embodiment except for step 3. Step 3 is modified as:
3. If sub-blocks A and D have the same reference index in the list, the following procedure is applied; otherwise go to step 4.
Set the current 8×8 depth partition type to 8×4 and fill the first 8×4 block of current 8×8 depth block with the motion data of sub-block A (i.e., using motion data of A0 as the representative motion data of A); fill second 8×4 block of current 8×8 depth block with the motion data of sub-block D (i.e., using motion data of D0 as the representative motion data of D).

In the sixteenth embodiment, the procedure is similar to the procedure of the fourteenth embodiment except for step 3. Step 3 is modified as:
3. If sub-blocks A, B, C and D have the same reference index in the list, the following procedure is applied; otherwise go to step 4.
Set the current 8×8 depth partition type to 4×4 and fill the first 4×4 block of current 8×8 depth block with the motion data of sub-block A (i.e., using motion data of A0 as the representative motion data of A); fill the second 4×4 block of current 8×8 depth block with the motion data of sub-block B (i.e., using motion data of B0 as the representative motion data of B); fill the third 4×4 block of current 8×8 depth block with the motion data of sub-block C (i.e., using motion data of C0 as the representative motion data of C); fill the fourth 4×4 block of current 8×8 depth block with the motion data of the sub-block D (i.e., using motion data of D0 as the representative motion data of D).

In the seventeenth embodiment, the P_8×8/P_8×8ref0/B_8×8 region is filled up with motion data for each list (list0 or list1) using the following procedure (referring to FIG. 9):
1. If all sub-blocks (i.e., A, B, C and D) have no valid reference data in the list, the following procedure is applied; otherwise go to step 2.
Set the current 8×8 depth partition type to 8×8 and fill each 4×4 block of current 8×8 depth block with the motion data of reference index −1 and motion vector (0,0).
2. If only one sub-block among A, B, C and D has valid reference data in the list, the following procedure is applied; otherwise go to step 3.
Set the current 8×8 depth partition type to 8×8 and fill each 4×4 block of current 8×8 depth block with the motion data of the sub-block having valid reference data.
3. If sub-blocks A, B, C and D have the same reference index in the list, the following procedure is applied; otherwise go to step 4.
Set the current 8×8 depth partition type to 4×4 and fill the first 4×4 block of current 8×8 depth block with the motion data of the sub-block A (i.e., using motion data of A0 as the representative motion data of A); fill the second 4×4 block of current 8×8 depth block with the motion data of the sub-block B (i.e., using motion data B0 as the representative motion data of B); fill the third 4×4 block of current 8×8 depth block with the motion data of the sub-block C (i.e., using motion data of C0 as the representative motion data of C); fill the fourth 4×4 block of current 8×8 depth block with the motion data of the sub-block D (i.e., using motion data of D0 as the representative motion data of D).

4. If sub-blocks A, B, C and D all have valid reference data and the reference indices are all different, the following procedure is applied.

Set the current 8×8 depth partition type to 8×8 and fill current 8×8 depth block with the same motion data of the texture sub-blocks at the same relative position as current 8×8 depth block within its MB. For example, if current 8×8 depth block is top-left 8×8 block of depth MB, it will use texture sub-block A (i.e., using motion data of A0 as the representative motion data of A) to fill the motion data.

The performance of a system incorporating the motion parameter inheritance according to an embodiment of present invention is compared to a conventional system using AVC based 3D video coding. The embodiment according to the present invention uses pre-defined motion data (i.e., motion vector (0,0)) for Intra-coded or VSP blocks. Performance comparisons between a system incorporating an embodiment of the present invention and a conventional system are shown in Table 2. The performance comparisons are based on the differences in bit-rate (dBR) and peak Signal-to-Noise ratio (dPSNR), where a negative dBR value or a positive dPSNR value indicates improvement over the conventional system. The comparisons are performed for test data sets S01 through S08. As shown in Table 2, the system incorporating an embodiment of present invention achieves slightly better performance (up to 0.6% in dBR for depth coding) than the conventional system. The complexity is about the same as the conventional system.

TABLE 2

| | Depth Coding | | Total (Synthesed PSNR) | | Complexity estimate | |
|---|---|---|---|---|---|---|
| | dBR, % | dPSNR, dB | dBR, % | dPSNR, dB | dBR, % | dPSNR, dB |
| S01 | 0.1 | 0.0 | 0.0 | 0.0 | 99.68 | 99.95 |
| S02 | −0.4 | 0.0 | 0.0 | 0.0 | 99.93 | 101.58 |
| S03 | −1.2 | 0.1 | −0.2 | 0.0 | 99.78 | 102.56 |
| S04 | −2.0 | 0.1 | 0.0 | 0.0 | 99.78 | 96.18 |
| S05 | −0.2 | 0.0 | −0.1 | 0.0 | 100.34 | 100.11 |
| S06 | −0.4 | 0.0 | 0.0 | 0.0 | 100.26 | 101.77 |
| S08 | −0.3 | 0.0 | 0.0 | 0.0 | 100.24 | 101.49 |
| Average | −0.6 | 0.0 | −0.1 | 0.0 | 100.00 | 100.52 |

Figure 10:
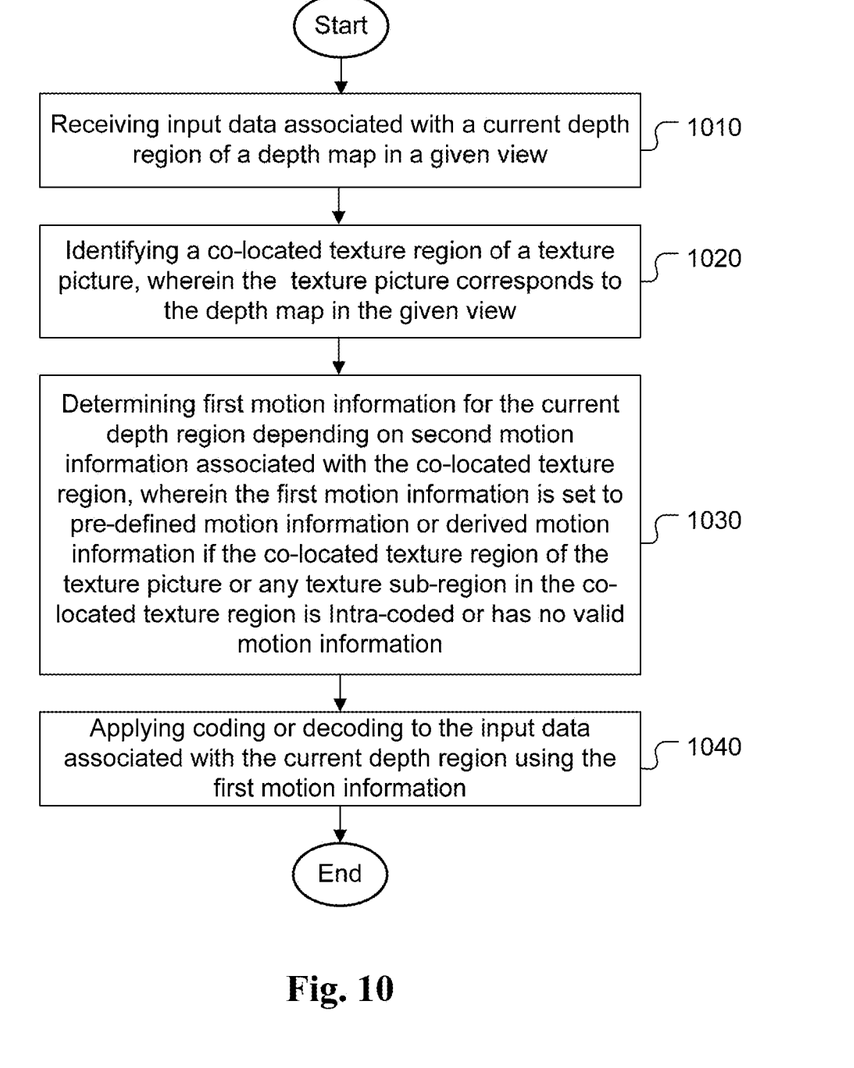
FIG. 10 illustrates an exemplary flowchart of a three-dimensional coding system incorporating motion parameter inheritance according to an embodiment of the present invention.

FIG. 10 illustrates an exemplary flowchart for a three-dimensional coding system incorporating motion information inheritance according to an embodiment of the present invention. The system receives input data associated with a current depth region of a depth map in a given view as shown in step 1010. The input data may be retrieved from storage such as a computer memory, buffer (RAM or DRAM) or other media. The input data may also be received from a processor such as a controller, a central processing unit, a digital signal processor or electronic circuits that derives the input data. A co-located texture region of a texture picture corresponding to the depth map in the given view is identified as shown in step 1020. First motion information for the current depth region is determined depending on second motion information associated with the co-located texture region as shown in step 1030, wherein the first motion information is set to pre-defined motion information or derived motion information if the co-located texture region of the texture picture or any texture sub-region in the co-located texture region is Intra-coded or has no valid motion information. Coding or decoding is applied to the input data associated with the current depth region using the first motion information.

The flowchart shown above is intended to illustrate an example of inter-view prediction based on sub-block partition. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional video coding, the method comprising:
   receiving input data associated with a current depth region of a depth map in a given view;
   identifying a co-located texture region of a texture picture corresponding to the depth map in the given view;
   determining whether the co-located texture region has unknown or invalid motion data, wherein the co-located texture region has unknown or invalid motion data if the co-located texture region of the texture picture or any texture sub-region in the co-located texture region is Intra-coded or a corresponding reference index is invalid;

responsive to the co-located texture region having unknown or invalid motion data, determining first motion information for the current depth region by setting the first motion information for the current depth region to pre-defined motion information or to motion information derived based on a neighboring texture region, and responsive to the co-located texture region having valid motion data, determining the first motion information for the current depth region depending on second motion information associated with the co-located texture region; and applying coding or decoding to the input data associated with the current depth region using the first motion information.

2. The method of claim 1, wherein the pre-defined motion information corresponds to motion vector (0,0), reference index 0, and a prediction type as indicated by a slice type.

3. The method of claim 1, wherein for the depth map having half horizontal and vertical resolutions of the texture picture and the co-located texture region corresponding to a texture macroblock, the first motion information for the current depth region is set to the pre-defined motion information or the derived motion information if the co-located texture region is coded using view synthesis prediction (VSP) or the co-located texture region is partitioned into 8×8 texture sub-regions, and wherein the 8×8 texture sub-region is selected from a group comprising P_8×8, P_8×8ref0 and B_8×8 texture sub-region.

4. The method of claim 3, wherein said determining first motion information for the current depth region depends on a subset of the 8×8 texture sub-regions.

5. The method of claim 3, wherein the first motion information for the current depth region is set to 8×8 partition type, reference index −1 and motion vector (0,0) if both top-left and bottom-right 8×8 texture sub-regions have no valid motion information.

6. The method of claim 3, wherein partition type for the current depth region is set to 8×8 and the first motion information for the current depth region is determined according to the second motion information associated with one of top-left and bottom-right 8×8 texture sub-regions having valid motion information if only one of the top-left and bottom-right 8×8 texture sub-regions has valid motion information.

7. The method of claim 3, wherein partition type is set to 8×4 and first motion information for a first current depth 8×4 sub-region is determined according to the second motion information of a top-left 8×8 texture sub-region, and the first motion information for a second current depth 8×4 sub-region is determined according to the second motion information of a bottom-right 8×8 texture sub-region if both of the top-left and bottom-right 8×8 texture sub-regions have a same valid reference index.

8. The method of claim 3, wherein partition type is set to 4×8 and the first motion information for a first current depth 4×8 sub-region is determined according to the second motion information of a top-left 8×8 texture sub-region, and the first motion information for a second current depth 4×8 sub-region is determined according to the second motion information of a bottom-right 8×8 texture sub-region if both of the top-left and bottom-right 8×8 texture sub-regions have a same valid reference index.

9. The method of claim 3, wherein partition type is set to 8×8 and the first motion information for the current depth region is determined according to the second motion information of the co-located texture region if top-left and bottom-right 8×8 texture sub-regions have different valid reference indices.

10. The method of claim 1, wherein the derived motion information is derived from a neighboring texture region or neighboring texture sub-region of the co-located texture region of the texture picture or from one or more texture sub-regions inside the co-located texture region.

11. The method of claim 10, wherein the first motion information for the current depth region is determined according to the second motion information associated with an Above, Left, Right or Below neighboring texture region or texture sub-region of the co-located texture region.

12. The method of claim 10, wherein the first motion information for the current depth region is determined according to first motion information associated with a neighboring depth region or depth sub-region of the current depth region.

13. The method of claim 1, wherein the current depth region corresponds to a current depth prediction unit (PU) and the co-located texture region corresponds to a co-located texture PU.

14. The method of claim 13, wherein the first motion information for the current depth PU is determined according to the second motion information associated with an Above, Left, Right or Below neighboring texture PU of the co-located texture PU.

15. An apparatus for three-dimensional video coding, the apparatus comprising:
one or more electronic circuits, wherein said one or more electronic circuits are configured to:
receive input data associated with a current depth region of a depth map in a given view;
identify a co-located texture region of a texture picture corresponding to the depth map in the given view;
determine whether the co-located texture region has unknown or invalid motion data, wherein the co-located texture region has unknown or invalid motion data if the co-located texture region of the texture picture or any texture sub-region in the co-located texture region is Intra-coded or a corresponding reference index is invalid;
responsive to the co-located texture region having unknown or invalid motion data, determine first motion information for the current depth region by setting the first motion information for the current depth region to pre-defined motion information or to motion information derived based on a neighboring texture region, and responsive to the co-located texture region having valid motion data, determining the first motion information for the current depth region depending on second motion information associated with the co-located texture region; and
apply coding or decoding to the input data associated with the current depth region using the first motion information.

16. A method for three-dimensional video coding, the method comprising:
receiving input data associated with a current depth region of a depth map in a given view;
identifying a co-located texture region of a texture picture corresponding to the depth map in the given view;
determining whether the co-located texture region has unknown or invalid motion data, wherein the co-located texture region has unknown or invalid motion data if a corresponding reference index of the co-located texture region of the texture picture or any texture sub-region in the co-located texture region is invalid;

responsive to the co-located texture region having unknown or invalid motion data, determining first motion information for the current depth region by setting the first motion information for the current depth region to pre-defined motion information according to a slice type, and responsive to the co-located texture region having valid motion data, determining the first motion information for the current depth region depending on second motion information associated with the co-located texture region; and applying coding or decoding to the input data associated with the current depth region using the first motion information.

* * * * *